(12) United States Patent
Rogers et al.

(10) Patent No.: US 7,850,529 B2
(45) Date of Patent: Dec. 14, 2010

(54) TRUNNION SUPPORT AND BEARING PARTICULARLY FOR UNIVERSAL JOINT

(75) Inventors: Kenneth Rogers, Huntersville, NC (US); Kenneth Lefew, Cheraw, SC (US); John Therriault, Milford, CT (US)

(73) Assignee: Schaeffler KG (DE)

( * ) Notice: Subject to any disclaimer, the term of this patent is extended or adjusted under 35 U.S.C. 154(b) by 556 days.

(21) Appl. No.: 11/861,989

(22) Filed: Sep. 26, 2007

(65) Prior Publication Data

US 2008/0234054 A1 Sep. 25, 2008

Related U.S. Application Data

(60) Provisional application No. 60/918,872, filed on Mar. 19, 2007.

(51) Int. Cl.
*F16D 3/42* (2006.01)
(52) U.S. Cl. ....................... 464/132; 464/136
(58) Field of Classification Search ......... 464/130–132, 464/136; 403/2; 384/126, 127, 420, 425
See application file for complete search history.

(56) References Cited

U.S. PATENT DOCUMENTS

| 4,050,130 | A | | 9/1977 | Pitner |
| 4,317,341 | A | | 3/1982 | Krude |
| 5,106,342 | A | * | 4/1992 | Fisher ..................... 464/132 |
| 6,264,566 | B1 | * | 7/2001 | Nieman et al. ............. 464/132 |

* cited by examiner

*Primary Examiner*—Greg Binda
(74) *Attorney, Agent, or Firm*—Ostrolenk Faber LLP

(57) ABSTRACT

A combination of an annular spacer, and a thrust washer in the opening of the spacer. The spacer and the thrust washer being connected by sacrificial tabs dimensioned to be stronger toward one of the spacer and thrust washer so that upon breaking of the sacrificial tabs, the tab remnants will stay with the one of the spacer and the washer to which it was more strongly attached. A trunnion on a spider of a universal joint and the trunnion is to be connected to a yoke arm. The trunnion being received in a trunnion cup. The spacer and the thrust washer combination being toward the bottom of the cup. An array of needle bearings around the periphery of the trunnion inside the cup. An annular seal in the cup sealing around the installed trunnion.

11 Claims, 6 Drawing Sheets

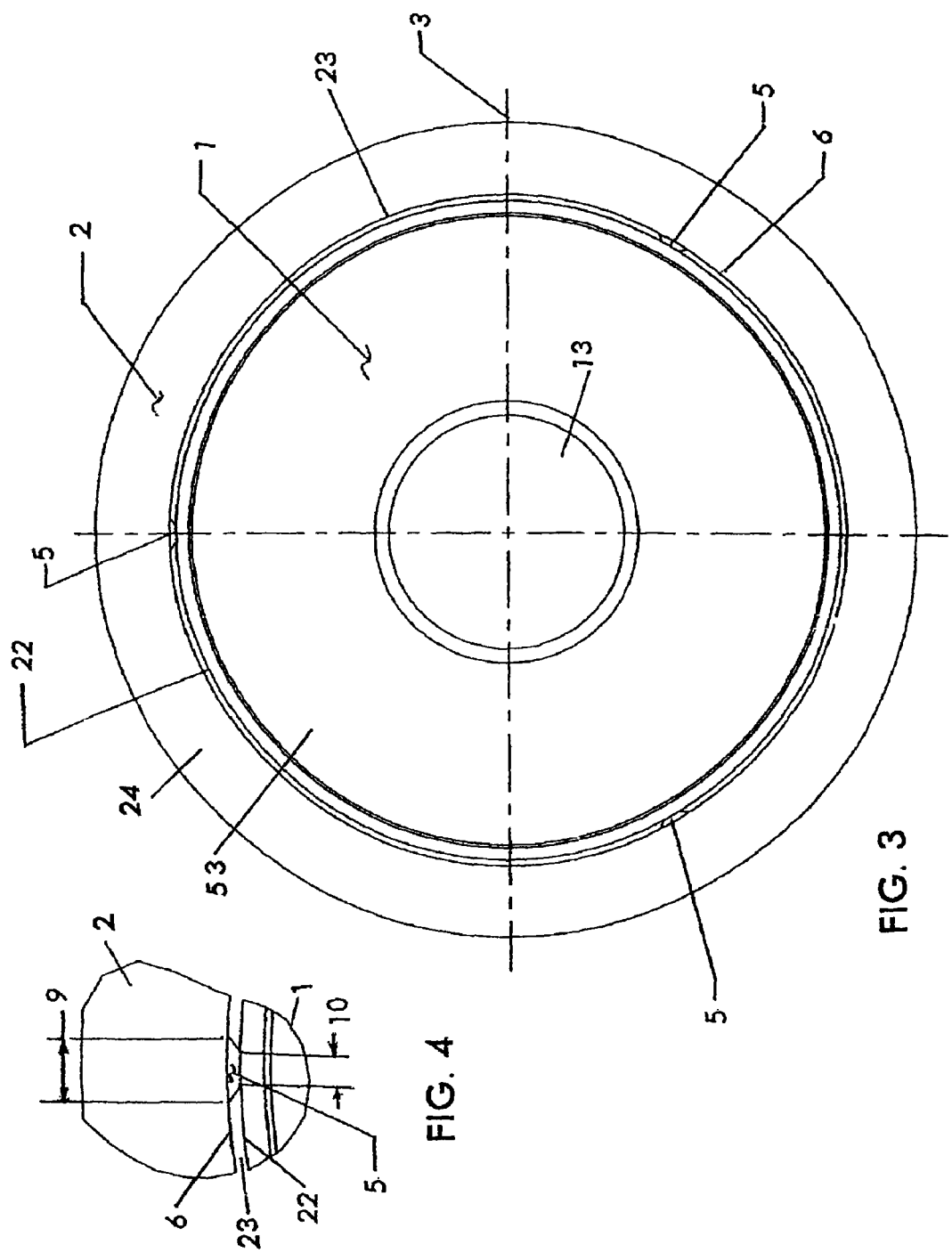

TRUNNION SUPPORT AND BEARING PARTICULARLY FOR UNIVERSAL JOINT

CROSS-REFERENCE TO RELATED APPLICATION

This application is based on and claims priority to U.S. Provisional Patent Application Ser. No. 60/918,872, filed on Mar. 19, 2007 and entitled TRUNNION SUPPORT AND BEARING PARTICULARLY FOR UNIVERSAL JOINT, the entire contents of which are hereby incorporated by reference herein.

BACKGROUND OF THE INVENTION

A universal joint is assembled between shafts typically to deliver torque through an angle. Examples of use of universal joints are in shafts connecting automotive steering columns to the steering gear, drive shafts for automobiles, trucks and vehicles and shafts used in industrial machines, off road equipment, airplanes, etc. Because the shafts rotate and typically define an angle at the universal joint, there is continuous relative motion between the crosspiece or spider of the universal joint and the yokes on the shafts or parts joined to the crosspiece or spider of the universal joint.

A universal joint is a structure well-known in the art. A main element of the universal joint is a crosspiece, also called a connector or spider. The crosspiece has respective pairs of trunnions which project radially out in opposite directions from the axis of the crosspiece. Each shaft end or part to be joined at the universal joint has a yoke to be connected to the crosspiece. Each yoke includes a pair of spaced apart arms each attached at one of a pair of opposite trunnions. Each arm of each yoke receives a respective projecting trunnion. The yoke arm has an opening that receives the trunnion.

If there is a bend in the shaft at the joint, as the shaft rotates, the bend is accommodated by each yoke arm moving circumferentially around its trunnion as the shaft including the joint is rotated. To accommodate such motion, a radial bearing is disposed between the exterior of the trunnion and the interior of the trunnion receiving opening in the yoke arm. That opening for the trunnion is typically defined by a cup installed in the yoke arm. The radial bearing is disposed between the exterior of the trunnion and the interior of the cup. The radial bearing is typically a needle bearing comprised of a circumferential array of axially extending needle rollers, which are thin, elongate cylindrical rollers. Typically, the bearing is received in the trunnion supporting cup disposed in the opening of the yoke arm, and the bearing rotates with respect to the exterior of the trunnion and the interior of the cup.

The cup for the trunnion is open at the end into which the trunnion is installed and is usually closed at the outer distal end beyond the end of the trunnion and beyond the radial or needle bearing. When the needle bearing is installed in the cup, the needles typically do not extend to the closed end of the cup. Between the outer distal ends of the bearing needles and the closed end of the cup, there may be a needle roller spacer which would support the outer ends of the needles.

In some applications of trunnions and cups for a universal joint, there is a thrust washer at the outer end of the cup, outward of the trunnion, which acts as a thrust and wear surface that bears axial loads applied by the outer trunnion face of the universal joint crosspiece or spider. In a universal joint having a thrust washer and a needle roller spacer, the needle roller spacer is shaped and sized to ensure that the needle rollers do not overhang the trunnion corner breaks or the distal outer peripheral edge of the trunnion. Integrated thrust washer and needle roller spacer configurations are known in many universal joint applications. For example, such integral, one-piece arrangements are suggested in U.S. Pat. Nos. 4,050,130 and 4,317,341.

In other applications, it may be desirable to have the thrust washer and needle roller spacer present in the trunnion cup be separate to operate as separate components. Providing separate thrust washer and needle roller spacer components may pose a problem during the bearing assembly process and during assembly of the bearing into the universal joints. During the bearing assembly process, there are normal vibration and shaking in the process and there is unpredictable manual handling which can create individual displacements of the thrust washer and the needle roller spacer. These displacements may include the thrust washer sliding under and particularly radially past the needle roller spacer which can produce problems later in the universal joint assembly. During assembly of the universal joint, a thrust washer separate from the needle roller spacer can fall out of the bearing entirely during handling of the bearing prior to its assembly into the arm of the yoke, which increases the possibility of early failure of the universal joint. To avoid these problems, additional vigilance is required during the manufacturing process, which ultimately increases the cost of the bearing assembly and of the universal joint assembly using the bearing assembly.

This problem had been recognized in the art and U.S. Pat. No. 5,106,342 shows one attempted solution. The thrust washer and needle roller spacer have a somewhat symmetrical thickness. There are connection tabs between the thrust washer and the needle spacer. Those tabs are deformable during installation of the combination and the trunnion in the combination to allow axial displacement of the thrust washer along the axis of the cup or the trunnion and that axial displacement is relevant to the needle roller displacement. Fracture of the tabs is a disclosed alternative.

However, this prior art system has drawbacks. Both anti-reversal capability and deformation of the connection tabs for relative axial displacement of the components requires a symmetric placement of the first washer thickness relative to the needle spacer thickness. This design symmetry may not allow for predictable and complete fracture of all of the connection tabs, if separation of the thrust washer from the spacer is required. If the thrust washer instead separates from the needle roller spacer prior to assembly of the universal joint, the thrust washer can fall out of the bearing assembly.

Connection tabs between the spacer and the thrust washer are likely to fracture during the assembly and particularly during insertion of the trunnion into the bearing cup. At fracture, connection tab fragments remain on one or both previously joined components. The location of the connection tab remnants after the fracture is not predictable if and when the thrust washer separates from the needle roller spacer. These fragments can result in possible interference by the tab remnants with the universal joint and with the trunnion. Further, if the thrust washer separates from the needle roller spacer during assembly of the bearing, the thrust washer could still slide under the needle roller spacer.

SUMMARY OF THE INVENTION

The present invention is intended to deal with all of the foregoing problems possibly caused by originally separate thrust washer and needle roller spacer components or from having tab connections of the type disclosed in U.S. Pat. No. 5,106,342.

According to the invention, a thrust washer and a needle roller spacer are connected by sacrificial connection tabs to initially form a single integrated component. The sacrificial connection tabs are designed to fracture to separate the thrust washer from the combined component at the correct stage during the joint assembly process. The thrust washer and the needle roller spacer may remain connected via the connection tabs during the entire bearing assembly process, which would prevent the thrust washer from sliding under the needle roller spacer during bearing assembly. Of course, if fracture during the bearing assembly process is desired, that can occur as well. Fracture of the sacrificial connection tabs and separation of the thrust washer from the needle roller spacer can be performed at any logical time during the bearing assembly process or during the subsequent universal joint assembly process using the bearing.

The shape, configuration, circumferential width and axial thickness of the connection tabs, the location of the connection tabs at the thrust washer, the configuration of the thrust washer for preventing its falling past the needle roller spacer are all improvements over the prior art design.

In particular, the tabs are dimensioned so that at least one dimension of the axial thickness and/or the circumferential width of the tab nearer to one of the thrust washer or the spacer is larger than the same type of dimension of the tab nearer to the other one of the thrust washer or the spacer.

The combined design with sacrificial connection tabs simplifies the bearing assembly process, reduces the need for extra manual handling and for extra visual inspections, increases overall assembly productivity, reduces the chance of subsequent malfunction of the joint and therefore reduces customer complaints due to malfunction and due to the thrust washer sliding under the needle roller spacer.

BRIEF DESCRIPTION OF THE DRAWINGS

FIG. 3 is a rear view across the axis showing a thrust washer and a needle roller spacer according to the invention.

FIG. 4 is an enlarged view of a fragment of FIG. 3 viewed across the axis and showing a circumferential direction configuration of the tab connection.

DESCRIPTION OF PREFERRED EMBODIMENT

Figure 1:
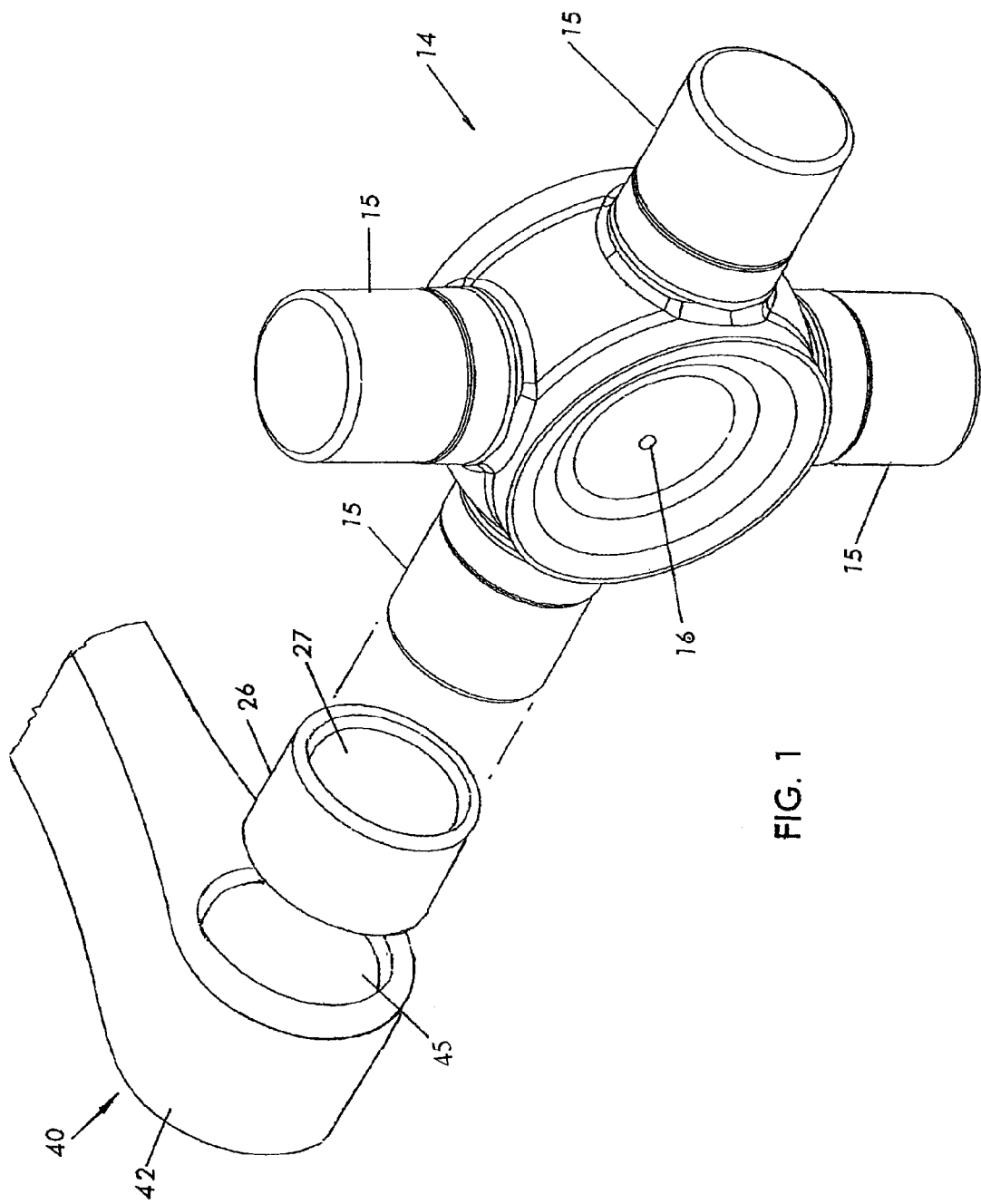
FIG. 1 is a perspective view of a crosspiece, spider or connector for a universal joint and having trunnions thereon and also showing a yoke arm which receives a trunnion.
Figure 7:
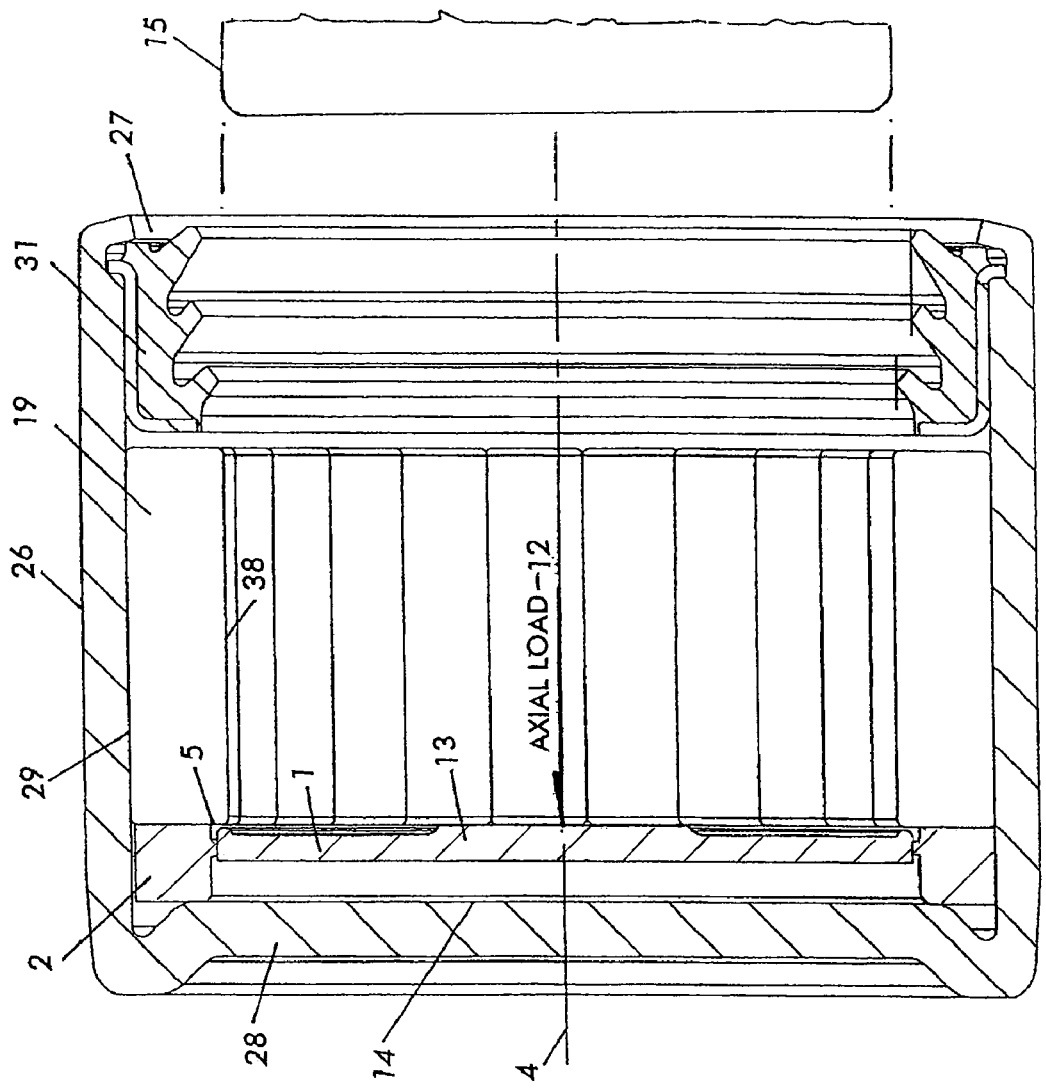
FIG. 7 shows a cross section of a bearing cup without a trunnion in it, in which the tab connected needle roller spacer and thrust washer are disposed.

FIG. 1 of the drawings shows the crosspiece, spider or connector 14 of a universal joint (not shown) with four trunnions 15 projecting out from the central axis 16 of the crosspiece in a planar array and equally spaced apart around the periphery of the crosspiece. Each opposite pair of projecting trunnions 15 will be received in a yoke arm 42 of the two yokes (not shown) that will be disposed on the trunnions of the crosspiece or spider 14. A bearing 19, shown in FIG. 7, is disposed around the periphery of each trunnion to enable it to rotate inside a respective trunnion cup 26 that is fixed in an opening 44 in the yoke arm 42 in which the trunnion is received.

Figure 2:
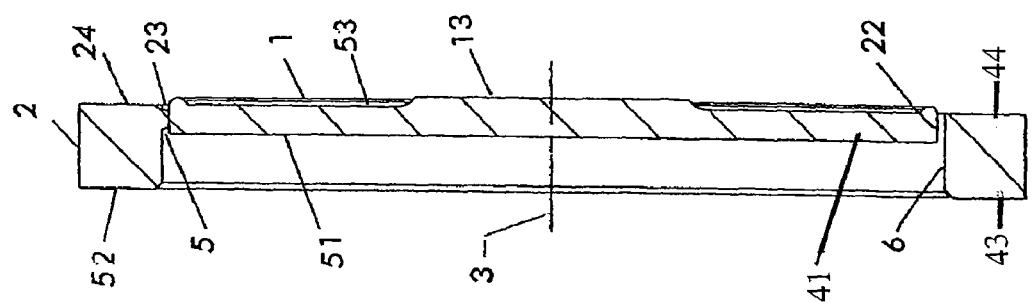
FIG. 2 is a side, cross sectional view of the needle roller spacer and thrust washer connected to each other according to the invention.

As shown in FIGS. 2 and 3, a thrust washer 1 is located centrally of needle roller spacer 2, and at least a portion of the thrust washer, up to the entire thrust washer, is spaced a short distance radially inward of the annular needle roller spacer 2. As shown in FIGS. 2-5, the washer 1 and spacer 2 are respectively sized in the radial direction to define a constant radial clearance 23 circumferentially around and between the radial outside periphery 22 of the thrust washer 1 and the radial inside perimeter 6 of the needle roller spacer 2. The thrust washer and needle roller spacer share the common axis 3 which coincides with the central axis 4 of the bearing (FIG. 7) and the central axis 16 of the trunnion (FIG. 1).

Each of the thrust washer 1 and the spacer 2 has respective first 51, 52 and second 53, 24 axially opposite sides and respective axial thickness between its axial sides. Both first sides 51, 52 face in the same direction into the below described cup 26 and the second sides 53, 24 face out of the cup. The spacer 2 is axially thicker than the thrust washer 1.

Sacrificial connection tabs 5 shown in FIGS. 2-5 extend radially from the outside periphery 22 of the thrust washer 1 to the inside perimeter 6 of the needle roller spacer 2. One such connection tab can be used but typically more than one is used depending upon the manufacturing and application requirements. When more than one sacrificial connection tab is used, the tabs may be either equally spaced around the circumferential space 23 between the thrust washer and needle roller spacer, as in FIG. 3, or asymmetrically spaced.

Figure 5:
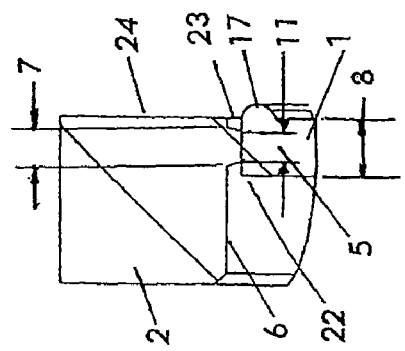
FIG. 5 is an enlarged fragmentary view along the axis of the needle roller spacer and thrust washer showing the axial direction configuration, placement and thickness of the tab connection.

As shown in FIGS. 2, 5, and 7, the axial location of the thrust washer 1 is generally asymmetric inside the needle roller spacer 2, the washer being generally further toward the second side 44 of the spacer and away from the closed end of the trunnion cup 26 in which the trunnion 15 and a bearing 19 are received and the first 41 side of the washer being spaced inward from the first side 43 of the spacer. The actual axial location of the thrust washer is dependent on the axial direction thickness 7 of the connection tabs 5 (FIG. 5), the axial direction thickness 8 of the thrust washer 1 and of the spacer 2 and the required axial direction displacement of the thrust washer which will be needed to ensure complete fracture of all of the sacrificial connection tabs 5.

The physical geometry and configuration of the sacrificial connection tabs is designed so that remnants of the sacrificial connection tabs can predictably remain with a selected one of the needle roller spacer and/or with the thrust washer or with both components after separation of the components.

For example, as shown in FIG. 4, the circumferential width of the sacrificial tab at the inside perimeter 6 of the spacer can be larger relative to the circumferential width 10 of the tab at the outside periphery 22 of the thrust washer 1. In addition or in the alternative, as shown in FIG. 5, the axial thickness 7 of the sacrificial tab at the inside perimeter 6 of the needle roller spacer can be larger relative to the thickness of the tab at the outside periphery 22 of the thrust washer. This configuration may ensure that the sacrificial connection tab remnants remain with the needle roller spacer after the thrust washer moves axially inside the spacer. In the alternative, if the tab remnants are to remain with the thrust washer, at least one of or both the circumferential width and the axial thickness of the tab would be larger at the thrust washer relative to those dimensions at the spacer.

Assembly of a trunnion to its respective yoke arm 42 (FIG. 1) involves providing a yoke 40 with a pair of yoke arms 42 and the yoke is at the proximal end of one of the two elements, including at least one shaft, that are joined at the universal joint crosspiece or spider 14. The yoke arm 42 has a trunnion receiving hole 45 in it. A cup 26 shown in FIGS. 1 and 7 is installed in the hole 45 in the yoke arm 42, typically after the bearing 19 is loaded into the cup, with the closed floor 28 of the cup 26 into the hole 45. Before the cup is installed in the hole 45, as shown in FIG. 7, the still attached together thrust washer 1 and needle roller spacer 2 are passed through the open end 27 of the cup 26 and are moved inward until the spacer 2 rests on the floor 28 of the cup 26. The washer side 51 is spaced up from the floor 28 by the spacer 2. Next, a complement of needle bearing rollers 19 is installed in the cup, with the ends of the rollers resting against the interior side of the spacer 2. This radial bearing 19 inside the bearing cup 26 comprises a circumferential array of axially extending bearing needles which roll between the inside of the cup 16 and the outside of the trunnion 15 and enable the rotation of the trunnion during operation of the universal point. Then behind the bearing, an optional seal 31 is installed in the cup. The seal is sized so that its radial interior engages the later installed trunnion 15 to seal the cup 26 yet permit the rotation of the trunnion. The assembled cup 26 is then installed in the hole 45 in the yoke arm. Alternatively, the cup 26 can be installed in the hole in the yoke arm before the other elements are installed in the cup.

Figure 8:
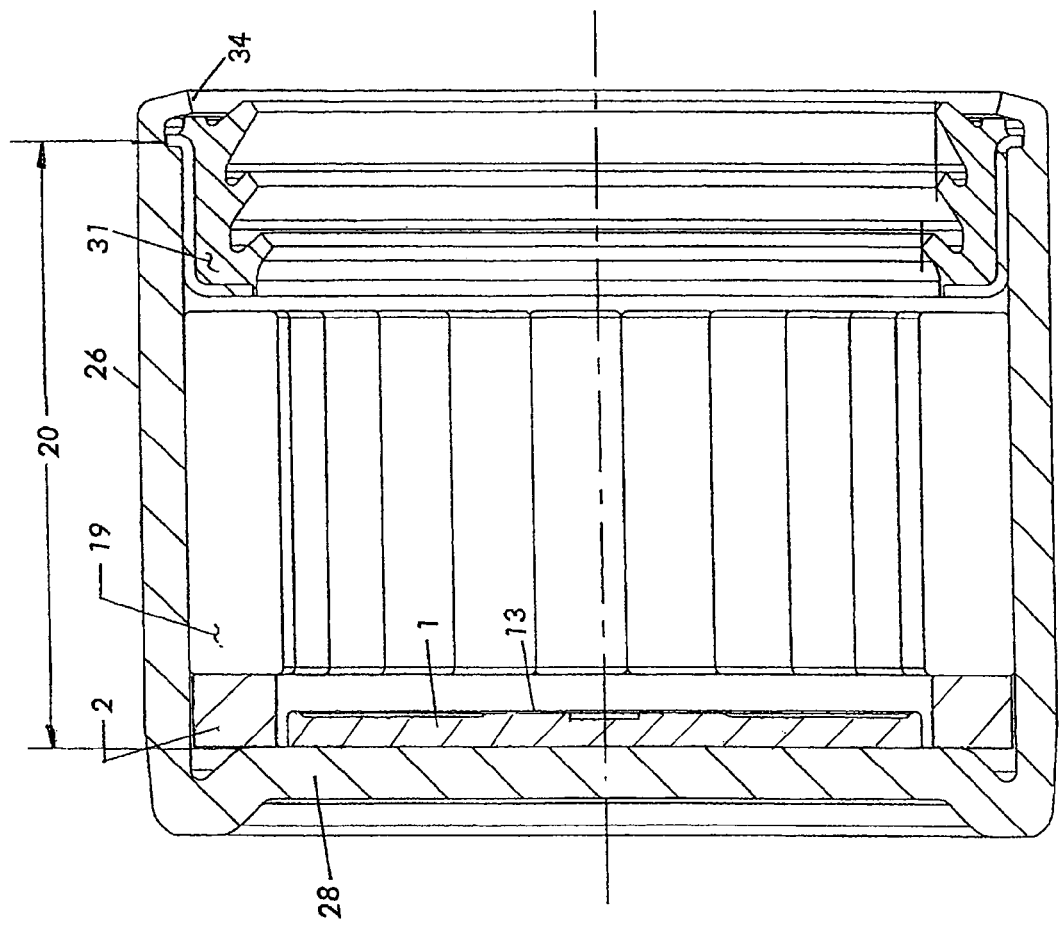
FIG. 8 is a view as in FIG. 7 after separation of the thrust washer and the needle roller spacer.

During the bearing assembly process, after the spacer and thrust washer are installed in the cup, preferably after the bearing is installed in the cup 26 and before the trunnion 15 is installed in the trunnion cup or as a result of installation of the trunnion, an axial load 12 may be applied to a button 13 located toward the center or around the axis of the thrust washer 1. The axial load on the washer will cause the complete fracture of all of the sacrificial connection tabs 5. After that fracture, the thrust washer 1 is axially displaced toward the closed floor 28 of the bearing cup 26, as shown in FIG. 8. The trunnion 15 is installed in the cup 26 inside the bearing 19 and the trunnion 15 is pushed toward the thrust washer 1, which thereafter receives axial loads applied by the trunnion during operation.

An alternative option for thrust washer separation is to apply an axial load to the thrust washer via the trunnion 15 of the universal joint crosspiece 14 during assembly of the universal joint. Following the fracture of the tabs 5 during assembly of the joint, the thrust washer and the trunnion continue to move axially together until the first side 51 of the thrust washer contacts the bottom 28 of the bearing cup 26 and until the trunnion reaches its finally assembly position.

Figure 6:
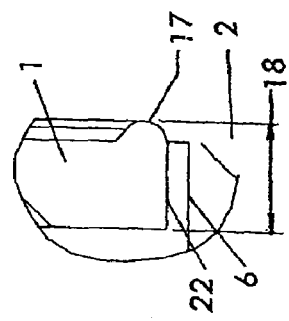
FIG. 6 is an enlarged view of a fragment of the peripheral region of the thrust washer at the needle roller spacer to illustrate its configuration which assists in preventing the thrust washer from falling past the needle roller spacer.
Figure 9:
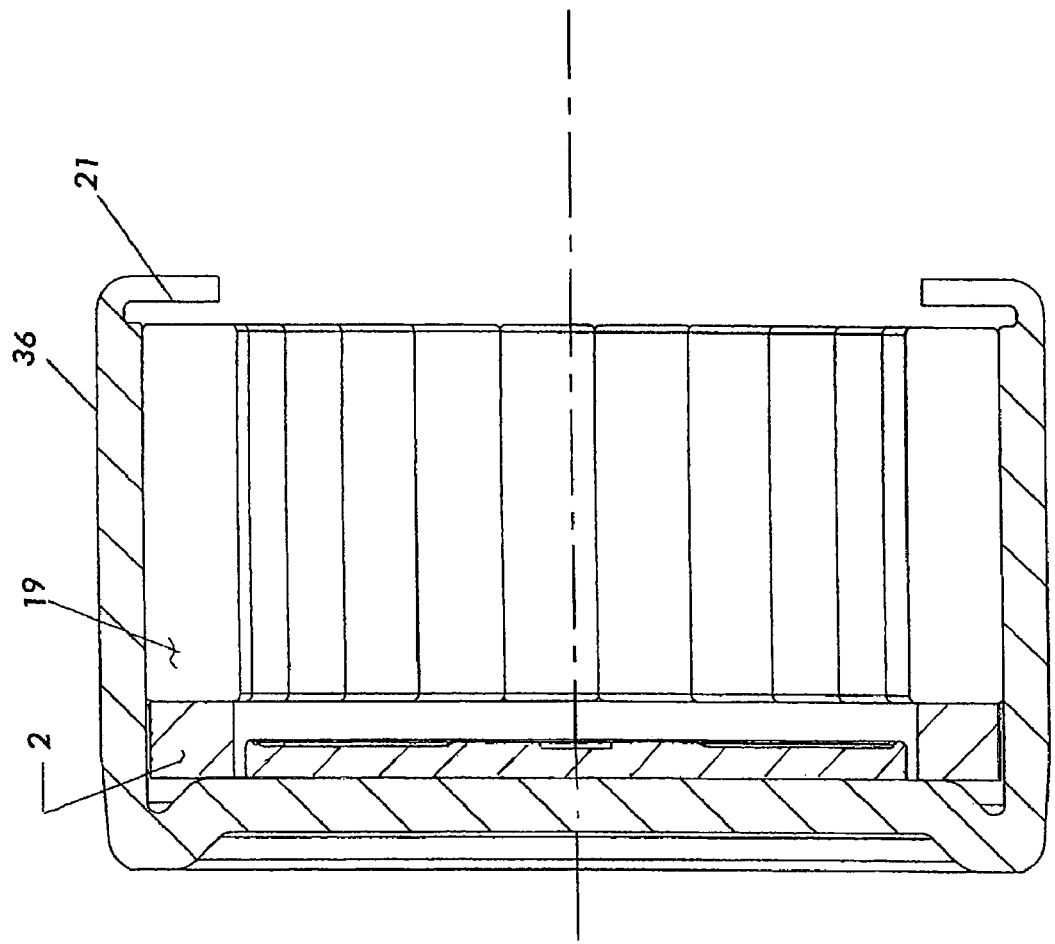
FIG. 9 is the same view as FIG. 8 showing a different design of a trunnion cup.

If the sacrificial connection tabs should fracture accidentally during bearing assembly or during universal joint assembly, before their intended time or fracture stage in the process, FIG. 6 shows an axial direction protrusion 17 located generally at a radially outer region of the second axial side 53, toward the outside periphery of the thrust washer, located and shaped and projecting in the axial direction outwardly of the cup a sufficient distance to prevent the thrust washer 1 from sliding under the needle roller spacer 2, if the separated washer is moved toward the bottom 28 of the cup 26. The increased axial thickness of the thrust washer at or near its outside periphery 22, near the needle roller spacer inside perimeter 6, prevents that undesired sliding of the thrust washer under the needle roller spacer. The minimum thickness 18 of the axial protrusion 17 is at least equal to or greater than the available axial clearance defined by the thickness of the needle roller spacer 2, the overall length of the needle rollers of the bearing 19, the axial position of the internal seal 31 and the axial width of that seal. If the bearing and trunnion cup 26 do not include an internal seal 31, as the embodiment in FIG. 9 does not, the axial clearance may be defined by the needle roller spacer thickness, the needle roller length and the inside of the bearing flange 21.

The axial protrusion 17 has the additional benefit of preventing a thrust washer which has separated from the needle roller spacer after assembly from sliding under the needle spacer during shipping, handling and use of the bearing.

The outside periphery of the thrust washer 22 is larger than the inside diameter 38 defined by the radial inside of the circumferential array of the needle rollers of the bearing 19 to prevent the separated thrust washer from falling out of the open end of the bearing during its assembly into the universal joint. An additional design option to prevent the separate thrust washer from falling out of the open end of the bearing is to size the outside diameter of the thrust washer to be greater than the inside diameter defined by the inner sealing lip 34 on bearing designs that have internal seals, as illustrated in FIG. 7.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A combination comprised of a thrust washer and a spacer for use with a trunnion, the combination comprising:

an annular spacer having a first axial thickness between a first axial side and an opposite second axial side along an axial direction, and an axial opening of a first diameter through the spacer along the axial direction, the opening having an inner perimeter;

a thrust washer having at least a portion thereof disposed inside the opening of the spacer, the thrust washer portion having at least a portion of a periphery of the washer with a second diameter that is less than the first diameter of the spacer opening, the thrust washer having a second axial thickness between a first axial side facing in the same axial direction as the first axial side of the spacer and an opposite second axial side facing in the same axial direction as the second axial side of the spacer, the thrust washer being positioned in the spacer opening such that the first axial side of the thrust washer is located axially inward in the opening from the first axial side of the spacer and toward the second side of the spacer;

the thrust washer has an outer region radially inward of the periphery thereof and of the at least one sacrificial tab, the thrust washer has an axial protrusion at the second axial side and at the outer region thereof so that the thrust washer is axially thicker at the outer region than radially inward of the outer region;

at least one sacrificial tab extending between and joined to the inner perimeter of the annular spacer at the opening and to the at least a portion of the periphery of the thrust washer;

the at least one tab being relatively weakened at either of the inner perimeter of the spacer opening or the periphery of the portion of the thrust washer, such that upon a force being applied to the thrust washer in the axial direction toward the first axial side of the axial spacer, the at least one sacrificial tab is broken at a location thereof toward the one of the spacer and the thrust washer where the sacrificial tab is weakened so that a remnant of the broken sacrificial tab will remain with the one of the thrust washer and the spacer where the sacrificial tab is not weakened;

the at least one sacrificial tab is weakened by having a smaller dimension at either the inner perimeter of the spacer or the outer periphery of the washer where the at least one tab is weakened, and the remnant of the at least one tab will remain with the one of the spacer and the washer where the at least one tab has at least one larger dimension than where the at least one tab is weakened, in at least one of the axial direction and a circumferential direction around the spacer.

2. The combination of claim 1, wherein the at least one sacrificial tab is at least one of axially thicker and circumferentially wider at the one of the spacer and the thrust washer to which the sacrificial tab remains upon breaking of the sacrificial tab.

3. The combination of claim 1, wherein the sacrificial tab is at least one of axially thicker and circumferentially wider at the spacer so that the sacrificial tab remains with the spacer upon breaking of the sacrificial tab.

4. The combination of claim 1, wherein the thrust washer has a central axis and a central region around the central axis, an axial thickening of the thrust washer at the central region thereof.

5. The thrust washer of claim 1, further comprising a plurality of the sacrificial tabs at intervals spaced circumferentially around the periphery of the thrust washer.

6. The combination of claim 1, wherein the spacer has a greater thickness between the first and second axial sides thereof than the thickness of the thrust washer between the first and second axial sides thereof.

7. An assembly comprising:
a bearing cup having a bottom and an open top;
the combination of claim 1 disposed in the bearing cup and toward the bottom thereof, with the spacer oriented with the first axial side thereof toward the bottom of the cup;
a plurality of rotary bearing elements in the cup supported in an array engaging the inner periphery of the cup, and the bearing elements having an inner axial end toward the second axial side of the spacer;
the thrust washer being of such thickness between the first and second axial sides thereof that after breaking of the at least one sacrificial tab and movement of the thrust washer toward the bottom of the cup and toward the first axial side of the spacer, the thrust washer is spaced from the inner axial side of the bearing elements.

8. The assembly of claim 7, wherein the bearing elements comprise an array of needle bearing elements extending axially in the cup.

9. The assembly of claim 7, further comprising a seal disposed in the cup axially outward of the bearing elements and operable for blocking the bearing elements from moving out of the cup;
the seal being annular and having a radial interior operable to seal against a trunnion installed in the cup inside the bearing elements.

10. The assembly of claim 7, wherein the bottom of the cup is shaped for having the first axial side of the spacer rest against the bottom of the cup and for supporting the first axial side of the thrust washer after the sacrificial tabs have been broken and the thrust washer has moved toward the bottom of the cup.

11. A combination comprised of a thrust washer and a spacer for use with a trunnion, the combination comprising:
an annular spacer having a first axial thickness between a first axial side and an opposite second axial side along an axial direction, and an axial opening of a first diameter through the spacer along the axial direction, the opening having an inner perimeter;
a thrust washer having at least a portion thereof disposed inside the opening of the spacer, the thrust washer portion having at least a portion of a periphery of the washer with a second diameter that is less than the first diameter of the spacer opening, the thrust washer having a second axial thickness between a first axial side facing in the same axial direction as the first axial side of the spacer and an opposite second axial side facing in the same axial direction as the second axial side of the spacer, the thrust washer being positioned in the spacer opening such that the first axial side of the thrust washer is located axially inward in the opening from the first axial side of the spacer and toward the second side of the spacer;
the thrust washer has an outer region radially inward of the periphery thereof and of the sacrificial tab, the thrust washer has an axial protrusion at the second axial side and at the outer region thereof so that the thrust washer is axially thicker at the outer region than radially inward of the outer region
at least one sacrificial tab extending between and joined to the inner perimeter of the annular spacer at the opening and to the at least a portion of the periphery of the thrust washer;
the at least one tab being relatively weakened at either of the inner perimeter of the spacer opening or the periphery of the portion of the thrust washer, such that upon a force being applied to the thrust washer in the axial direction toward the first axial side of the axial spacer, the at least one sacrificial tab is broken at a location thereof toward the one of the spacer and the thrust washer where the sacrificial tab is weakened so that a remnant of the broken sacrificial tab will remain with the one of the thrust washer and the spacer where the sacrificial tab is not weakened.

* * * * *